(No Model.)
F. O. GODMAN.
VEHICLE BRAKE.
No. 582,584. Patented May 11, 1897.
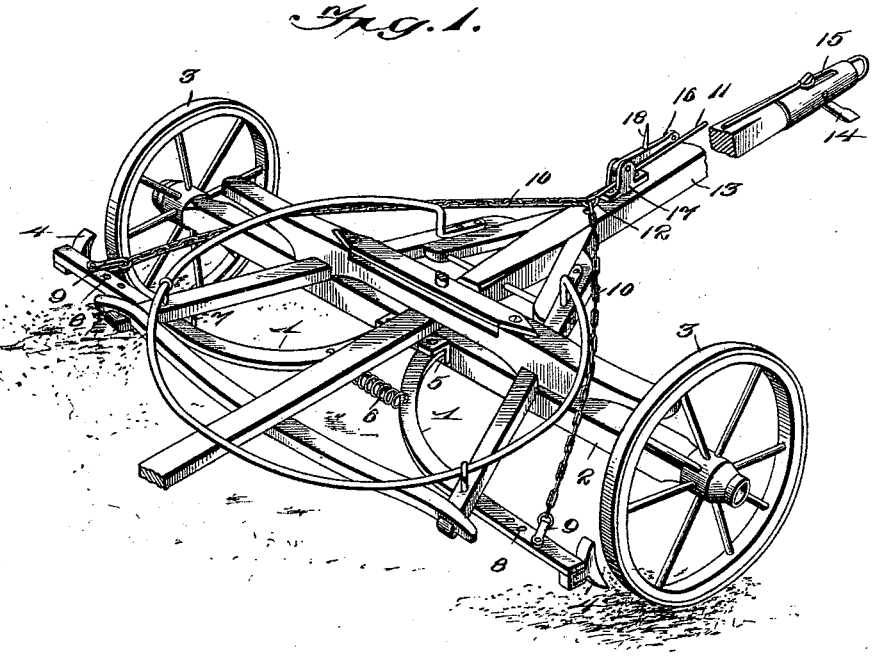
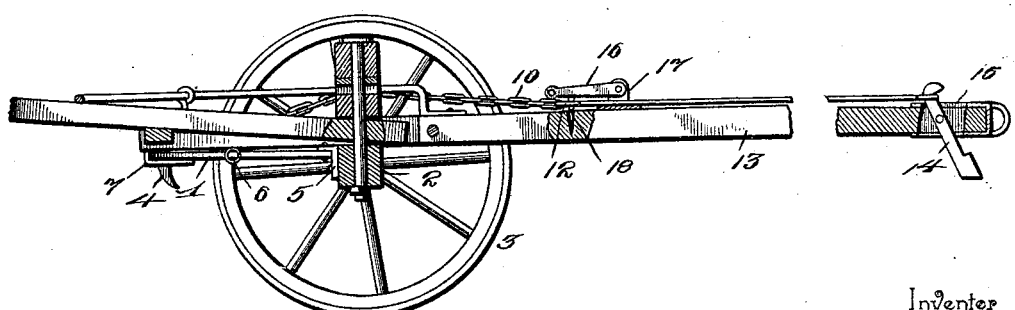
Inventor
Forgus O. Godman
Witnesses
By his Attorneys,

UNITED STATES PATENT OFFICE.

FORGUS O. GODMAN, OF FORT WAYNE, INDIANA, ASSIGNOR OF ONE-HALF TO ISAAC O. RUSSELL, CHARLES E. THOMPSON, AND DANIEL E. STORMS, OF LAFAYETTE, INDIANA.

VEHICLE-BRAKE.

SPECIFICATION forming part of Letters Patent No. 582,584, dated May 11, 1897.

Application filed October 29, 1896. Serial No. 610,479. (No model.)

*To all whom it may concern:*

Be it known that I, FORGUS O. GODMAN, a citizen of the United States, residing at Fort Wayne, in the county of Allen and State of Indiana, have invented a new and useful Vehicle-Brake, of which the following is a specification.

The invention relates to improvements in automatic vehicle-brakes.

The object of the present invention is to improve the construction of automatic vehicle-brakes and to provide a simple device adapted to be operated by back pressure of the neck-yoke and capable of effectually engaging the front wheels of a vehicle to check the forward movement in descending an incline.

A further object of the invention is to enable the parts to be readily arranged so that the brake will not be applied while backing a team.

The invention consists in the construction and novel combination and arrangement of parts hereinafter fully described, illustrated in the accompanying drawings, and pointed out in the claims hereto appended.

In the drawings, Figure 1 is a perspective view of a portion of a running-gear provided with an automatic brake constructed in accordance with this invention. Fig. 2 is a longitudinal sectional view of the same.

Like numerals of reference designate corresponding parts in both figures of the drawings.

1 1 designate a pair of rearwardly-diverging curved brake-levers fulcrumed at their front ends, preferably at the center of the front axle 2 of the running-gear, and having their outer ends located in rear of the front wheels 3 and carrying brake-shoes 4, adapted to engage the wheels 3 when the brake is applied. A bracket 5 is secured to the rear face of the axle 2 and is provided with a pair of rearwardly-disposed lugs, which are perforated for the reception of the pivots which fulcrum the brake-levers 1, and the latter are normally held out of engagement with the wheels by a transversely-disposed spiral spring 6, connecting them near their front ends.

The outer portions of the levers, which are arranged in suitable keepers 7 of the front hounds, are provided with a series of perforations 8, adapted to permit the adjustment of a clevis 9, to which a pair of chains 10 are connected. The chains converge forwardly, preferably extending across the sand-bolster, and are secured at their front terminals to the rear end of a connecting-rod 11, and the latter is provided at its rear end with an eye 12, into which the front ends of the chains are linked. The connecting-rod, which extends longitudinally of the tongue or pole 13, is operated by a yoke-engaging device consisting, preferably, of a lever 14, fulcrumed in a slot 15 of the front end of the tongue or pole extending beneath the same and adapted to be engaged by a neck-yoke center, whereby the backward pressure of the draft-animals will produce an application of the brake to prevent the vehicle from running forward on the animals. As soon as the draft-animals start forward the wheels are immediately relieved of the brake by the transversely-disposed coiled spring, which connects the brake-levers.

In backing, the automatic brake is held out of engagement by a locking device consisting of a bar 16, pivoted at one end between perforated lugs of a plate 17, and provided intermediate of its ends with an integral pin or projection 18, adapted when the bar is swung rearward to engage the eye 12 of the connecting-rod and lock the latter against longitudinal movement. The connecting-rod passes between the perforated ears of the plate 17 and is guided by the latter, and the bar 16 is adapted to be swung forward, as illustrated in Fig. 1 of the accompanying drawings, when it is desired to permit the automatic brake to operate. The plate 17 is secured to the upper face of the tongue or pole and the ears extend upward therefrom.

It will be seen that the automatic brake is exceedingly simple and inexpensive in construction, that it is positive and reliable in operation, and that the back pressure of the neck-yoke on the lower end of the lever 14 causes the brake-shoes to engage the front wheels. It will also be seen that by adjusting the clevises 9 the degree of pressure of the brake-shoes on the front wheels may be readily regulated, and that in backing the parts may be readily arranged to prevent the brake from being applied.

Changes in the form, proportion, and minor details of construction may be resorted to without departing from the principle or sacrificing any of the advantages of the invention, such as varying the construction of the neck-yoke-engaging device.

What I claim is—

1. In an automatic vehicle-brake, the combination with a running-gear, of a pair of rearwardly-diverging brake-levers fulcrumed at their front terminals to the center of the front axle and having their rear terminals located in rear of the front wheels, brake-shoes carried by the rear end of the brake-levers, a coiled spring connecting the brake-levers near the front ends thereof and adapted to hold the brake-shoes normally off the wheels, a neck-yoke-engaging device arranged at the front end of the pole, and connections between the neck-yoke device and the brake-levers, substantially as and for the purpose described.

2. In an automatic vehicle-brake, the combination with a running-gear, of a pair of brake-levers, fulcrumed at their front ends at the center of the front axle and extending rearward and having their rear ends arranged to engage the front wheels, brake-shoes mounted on the rear ends of the brake-levers, a coiled spring connecting the brake-levers near the front ends thereof, a connecting-rod mounted on the tongue or pole, chains attached to the rear end of the connecting-rod and adjustably secured to the brake-levers at the outer ends thereof, and a neck-yoke-engaging device located at the front end of the connecting-rod, substantially as described.

3. In an automatic vehicle-brake, the combination with a running-gear, of a pair of brake-levers fulcrumed at their front ends at the center of the front axle and extending rearward with their rear ends arranged to engage the front wheels, a coiled spring connecting the brake-levers, a pair of forwardly-converging chains secured to the brake-levers and extending to the pole, a connecting-rod mounted on the pole and provided at its rear end with an eye linked into the front ends of the chains, and a locking device consisting of a pivoted bar mounted on the pole and provided with a pin or projection arranged to engage the eye of the connecting-rod, substantially as described.

In testimony that I claim the foregoing as my own I have hereto affixed my signature in the presence of two witnesses.

FORGUS O. GODMAN.

Witnesses:
JOSEPH G. RANK,
EDWARD J. SCOONOVER.